US012375119B2

United States Patent
Spar

(10) Patent No.: US 12,375,119 B2
(45) Date of Patent: Jul. 29, 2025

(54) STRETCHY NET HOLDER FOR MOBILE ELECTRONIC DEVICES

(71) Applicant: Red Heeler Group, LLC, Chandler, AZ (US)

(72) Inventor: Linda Spar, Chandler, AZ (US)

(73) Assignee: Red Heeler Group, LLC, Chandler, AZ (US)

( * ) Notice: Subject to any disclaimer, the term of this patent is extended or adjusted under 35 U.S.C. 154(b) by 121 days.

(21) Appl. No.: 18/380,395

(22) Filed: Oct. 16, 2023

(65) Prior Publication Data

US 2024/0039574 A1  Feb. 1, 2024

Related U.S. Application Data

(63) Continuation-in-part of application No. 17/713,676, filed on Apr. 5, 2022, now Pat. No. 11,792,312.

(60) Provisional application No. 63/170,741, filed on Apr. 5, 2021.

(51) Int. Cl.
| | |
|---|---|
| *H04M 1/00* | (2006.01) |
| *H04B 1/3888* | (2015.01) |
| *H04M 1/04* | (2006.01) |

(52) U.S. Cl.
CPC ............ *H04B 1/3888* (2013.01); *H04M 1/04* (2013.01)

(58) Field of Classification Search
CPC ...... H04B 1/3888; H04M 1/04; H04M 1/185; A45C 11/00; A45C 11/002; A45C 13/36
See application file for complete search history.

(56) References Cited

U.S. PATENT DOCUMENTS

| | | | |
|---|---|---|---|
| D606,986 S | 12/2009 | De Jong et al. | |
| 7,954,207 B2 | 6/2011 | Farerni | |
| D671,932 S | 12/2012 | Azoulay | |
| D687,427 S | 8/2013 | Peterson | |
| D706,256 S | 6/2014 | Ward et al. | |
| D720,726 S | 1/2015 | Yu | |
| 9,219,516 B2 | 12/2015 | Haymond | |
| 9,314,078 B1 | 4/2016 | Haymond et al. | |
| D764,451 S | 8/2016 | Hung et al. | |
| 10,879,711 B2 * | 12/2020 | Lollo | H02J 7/0044 |
| 2012/0063066 A1 * | 3/2012 | Floit | H04B 1/385 |
| | | | 361/679.01 |

(Continued)

FOREIGN PATENT DOCUMENTS

| | | |
|---|---|---|
| CN | 204305107 U | 4/2015 |
| CN | 205987035 U | 2/2017 |

(Continued)

*Primary Examiner* — Pakee Fang
(74) *Attorney, Agent, or Firm* — Eckert Seamans Cherin & Mellott, LLC

(57) ABSTRACT

A stretchable net cover or case for a mobile electronic device that provides multiple grasp points and configurations, providing a user with a plurality of ways to hold and use their devices. A user may slide one or more fingers through openings in the webbing to grasp the device, may slide the webbing over a forearm, or may hook the device to a purse, belt loop, carabiner, lanyard, retractable or static leash via the webbing. The cover may be provided as an add-on, i.e., designed for use over a mobile electronic device alone or a device enclosed within a case, or may be provided as part of a case for a mobile electronic device.

17 Claims, 14 Drawing Sheets

(56) References Cited

U.S. PATENT DOCUMENTS

| | | | |
|---|---|---|---|
| 2012/0305445 A1* | 12/2012 | Hu ........................ | A45C 11/00 |
| | | | 206/775 |
| 2014/0226268 A1* | 8/2014 | O'Neill ................ | H04B 1/3888 |
| | | | 361/679.01 |
| 2015/0318885 A1* | 11/2015 | Earle ...................... | H04B 1/385 |
| | | | 455/575.6 |
| 2016/0105209 A1 | 4/2016 | Dunn et al. | |
| 2018/0159579 A1 | 6/2018 | Garcia | |
| 2019/0208879 A1* | 7/2019 | Gawley ................ | A45C 13/02 |
| 2019/0246757 A1* | 8/2019 | Igarashi ................ | A45C 11/00 |
| 2019/0363747 A1 | 11/2019 | Gil Vera | |
| 2020/0214411 A1* | 7/2020 | Del Moral .......... | A45C 11/003 |
| 2021/0106125 A1* | 4/2021 | Thomas .................... | A45F 3/04 |

FOREIGN PATENT DOCUMENTS

| | | |
|---|---|---|
| CN | 208539974 U | 2/2019 |
| CN | 209017096 U | 6/2019 |
| CN | 210988682 U | 7/2020 |
| GB | 2515397 B | 2/2015 |
| JP | 3212380 U | 9/2017 |
| KR | 101753173 B1 | 7/2017 |
| WO | 2014207647 A1 | 12/2014 |
| WO | 201841765 A1 | 3/2018 |

\* cited by examiner

STRETCHY NET HOLDER FOR MOBILE ELECTRONIC DEVICES

CROSS REFERENCE TO RELATED APPLICATIONS

The present application is a continuation-in-part application of U.S. patent application Ser. No. 17/713,676, filed May 5, 2022, now U.S. Pat. No. 11,792,312, which claims priority to U.S. Provisional Patent Application Ser. No. 63/170,741, filed Apr. 5, 2021, both of which are incorporated herein in their entirety.

TECHNICAL FIELD OF THE INVENTION

The embodiments relate generally to an attachment for a mobile electronic device, such as a stretchy net configured to fit around a mobile electronic device to provide expanded options for securely holding the device.

BACKGROUND OF THE INVENTION

The mobile phone or smartphone, like the Apple iPhone and the Samsung Galaxy, has evolved from a simple cellular phone absent a camera and basic SMS functions to a ubiquitous device that not only provides voice communication, but functions in daily work and personal life through the use of apps such as email, social media, internet of things, video chat via cellular, internet, and wide area networks. Most people view their phones as an extension of themselves, their offices, companies, and smart homes, and panic if they cannot quickly locate their device in a pocket, purse, or bag.

Women slip phones under bra straps or yoga pant waistbands. Men carry their mobile phones in bulky cases attached to belts. Phones work their way to the bottom of purses and backpacks. They are dropped and cracked as we search for them, pulling them out of bags, pockets, and briefcases. People may leave them behind during a "quick trip" down the stairs to the basement or garage or outside to the mailbox because they have no pockets. In the event of a slip or fall, they would have no easy means of calling for help.

For years the world population has simply accepted the practice of cradling or holding such a vital extension of their existence in their hands. Until recently, cases for such devices have only focused on protecting the phone from moisture damage or impact damage, such as from dropping the phone onto the floor or ground. Most cases are of smooth or rugged design, but still require the user to hold the phone—at times precariously—while using it in a crowd or leaning over a ledge, railing, window or building to take a photo or selfie. A few adhesive ad-ons, like a PopSocket, ring, or strap are available. More recently, longer "leashes" that loop through a case or attach through the phone's charging port have become available. However, these items very often don't solve the problem of dropping the phone, especially if you are jostled. The phone can slip between fingers while using a PopSocket, for example. When held by one finger in the commonly used ring and loop attachments, that one finger can slip or rotate out of the inflexible loop or ring. Most importantly, these holders can fall off the phone if they are not integrated with a case, since the adhesive dries, wears, weakens or becomes wet or dirty.

Cases have been designed to cure this deficiency by integrating holding or carrying straps with the case. For example, U.S. Design Pat. Nos. D687,427, D764,451, and D671,932; UK Pat. No. GB2515397; U.S. Pat. Application Pub. No. 2018/0159579 and 2019/0363747; U.S. Pat. Nos. 9,314,078 and 9,219,516; International Pat. Pub. No. WO 2018/041765; Korean Pat. No. KR101753173; and Chinese Pat. Nos. CN209017096U, CN210988682U, and CN205987035U each disclose phone cases that include one or more thick bands of material as part of a case of the device. While these bands of material are indicated to be useful for holding the phone, they provide the user with limited access options and holding configurations, i.e., they only allow a user to grasp the phone in one orientation of the phone and/or user's hand. Moreover, many of these disclosures also do not provide a means to attach accessories or carry additional items, such as a user's credit cards, money, or keys, within the bands of material as they are spaced too widely or are not provided in sufficient quantity.

A case providing a webbing of flexible material that could cure some of these deficiencies is disclosed in Chinese Pat. No. CN208539974U. However, while the webbing offers increased grasp points for a user's hands and/or fingers, it is provided on only a small portion at the back of the case and includes widely spaced webbing, limiting its overall usefulness. Additional examples of flexible webbing are shown in U.S. Pat. Application Pubs. 2016/0105209, U.S. Pat. No. 7,954,207, U.S. Design Pats. D706,256, and Chinese Pat. No. CN204305107U. The bands of material, however, are provided to help dissipate heat from the device or to protect the device from impact damage and thus are not configured to assist gripping or holding the device, i.e., are not stretchable.

Accordingly, a need exists for improved methods for grasping or holding a mobile electronic device such as a smart phone so that it may be more safely used.

SUMMARY OF THE INVENTION

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

The presently disclosed invention relates to a stretchable net cover for a mobile electronic device that provides multiple grasp points and configurations, providing a user with a plurality of ways to hold and use their devices. For example, a user may slide one or more fingers through openings in the netting or webbing to grasp the device, may slide the webbing over a forearm, or may hook the device to a purse, belt loop, carabiner, lanyard, or retractable or static leash via the webbing. The cover may be provided as an add-on, i.e., designed for use over a mobile electronic device alone or a device enclosed within a case, or may be provided as a case or part of a case for a mobile electronic device.

Accordingly, the presently disclosed invention provides a cover comprising a body formed of a flexible webbing, wherein the webbing is configured to cover a back, sides, and optionally, a portion of a front of a mobile electronic device, and a frame having a top edge, a bottom edge, and opposing side edges that define an opening in the body configured to expose a front screen region of the mobile electronic device. The body and frame each comprise a flexible material configured to provide removeable attachment of the cover over the mobile electronic device. Moreover, the flexible webbing is configured to accept a user's fingers or other body part (e.g., wrist, forearm) through mesh openings, and/or may provide attachment to an object such as a door handle or an exercise bike handle, or by an object such as a key ring or carabiner, and the like.

Certain portions of the flexible webbing may be enhanced by a solid construction of the same or different material as the webbing to provide support and durability. Exemplary reinforced portions include corners of the cover. Moreover, a back region of the cover may be absent any solid construction. As such, the cover may include webbing that is enhanced by a solid construction of the same or different material as the webbing at corners of the cover while being absent any solid construction along a remainder of a rear portion of the cover.

The body and frame are generally configured to provide removeable attachment of the cover over a range of sizes of mobile electronic devices, such that small increases or decreases in the length, width, or thickness of the device, or addition of a case on the mobile electronic device, may be accommodated by the same cover.

The stretchable net cover provides at least two configurations, including: (i) an initial configuration in which the cover is separated from the mobile electronic device, wherein the top, bottom, and side edges of the frame have a first overall dimension, and the body is unstretched, and (ii) an installed configuration in which the cover is positioned around the mobile electronic device so that the body is stretched about the back and sides of the mobile electronic device, and the top, bottom, and side edges of the frame have a second overall dimension substantially the same as the first overall dimension.

The webbing of the cover may comprise a flexible material and the frame may comprise a thickened or solid region of the webbing. The body and the frame may comprise the same or different flexible materials. The body and frame may comprise a unitary construction. Moreover, the body of the cover may include one or more webbing designs, i.e., the shape, size, and configuration of the openings in the webbing may vary over different regions of the cover.

The webbing of the cover may have a webbing thickness (i.e., thickness as measured perpendicular to the longitudinal axis of the cover) of 0.5 mm to 20 mm, and/or webbing openings with a diameter (i.e., width as measured along the longitudinal or lateral axis of the cover) of 0.3 cm to 10 cm, preferably 2 cm to 5.5 cm. The mesh openings may vary in size across a longitudinal or lateral extent of the body portion, such as larger or smaller in regions positionable adjacent a top of the mobile electronic device.

The webbing of the cover is generally flexible, such as formed of a flexible elastic webbing or flexible polymeric material formed into a webbing. Exemplary polymeric materials have a durometer of 20 A to 65 A (Shore A hardness), such as thermoplastic elastomers (natural and synthetic rubbers, silicones, polydimethylsiloxane (PDMS) or silicone rubber, poly(butyl methacrylate), thermoplastic polyurethane resin (TPU), styrenics, copolyesters, polyurethanes, polyamides, polyolefin blends, polyolefin alloys, polyolefin plastomers and elastomers (e.g., very low molecular weight, linear low-density polyethylene).

The cover may generally be configured to cover a cellular phone, a tablet computer, a laptop computer, an electronic gaming system, a digital music player, a global positioning system, and combinations thereof. The cover may also be configured to fit over a case that encloses a cellular phone, a tablet computer, a laptop computer, an electronic gaming system, a digital music player, or a global positioning system. In general, the cover may be flexible enough to accommodate the mobile electronic device when positioned in a case and when removed from the case.

The frame of the cover may be shaped to be coincident with a shape of the front screen region of the mobile electronic device. Moreover, portions of the flexible webbing of the body may be specifically designed to accommodate access points on the mobile electronic device when the cover is installed thereon or may be removeable to accommodate access points on the mobile electronic device when the cover is installed thereon.

The presently disclosed invention also provides a case for a mobile electronic device. The case generally comprises a side wall configured to extend around a perimeter of a mobile electronic device, the side wall having a front perimeter and a rear perimeter; and a webbing formed of a flexible material, the webbing connected along the rear perimeter of the side wall. The side wall and webbing are configured to provide removeable attachment of the case about the mobile electronic device such that a front portion of the mobile electronic device remains substantially uncovered and a rear portion of the mobile electronic device is substantially covered by the webbing. Moreover, the webbing comprises openings configured to accept a user's fingers therethrough.

The front perimeter of the side wall may comprise an inward lip member configured to extend inward around a front of the mobile electronic device, wherein the inward lip member is repeatably deflectable to provide secure engagement of the mobile electronic device within an inner perimeter of the side wall of the case.

The side wall and the webbing may be of unitary construction and may be formed of a flexible silicone material having a Shore A hardness of 20 A to 65 A. Alternately, the webbing and the side wall may be formed of different materials, such as materials having differing Shore A hardness.

Portions of the webbing, the side wall, or both the webbing and the side wall of the case may be absent to accommodate one or more access points on the mobile electronic device when the case is installed thereon.

The case may include a back panel attached along the rear perimeter of the side wall, wherein the side wall extends substantially perpendicular from the back panel, and wherein the webbing is disposed over an outer surface of the back panel, an inner surface of each of the back panel and the side wall forming an inner region of the case configured to accept the mobile electronic device therein. When included, portions of the back panel may be absent to accommodate one or more access points on the mobile electronic device when the case is installed thereon.

The webbing of the case may have a webbing thickness (i.e., thickness as measured perpendicular to the longitudinal axis of the cover) of 0.5 mm to 20 mm, and/or webbing openings with a diameter (i.e., width as measured along the longitudinal or lateral axis of the cover) of 0.3 cm to 10 cm, preferably 2 cm to 5.5 cm. The mesh openings may vary in size across a longitudinal or lateral extent of the case, such as larger or smaller in regions positionable adjacent a top of the mobile electronic device.

The case may be configured to cover any mobile electronic device configured for communication, entertainment, control, education, or the like, such as a cellular phone, a tablet computer, an electronic gaming system, a digital music player, a laptop computer, a global positioning system, or any combination thereof.

BRIEF DESCRIPTION OF THE DRAWINGS

Aspects, features, benefits, and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale.

DETAILED DESCRIPTION

Figures 1, 2:
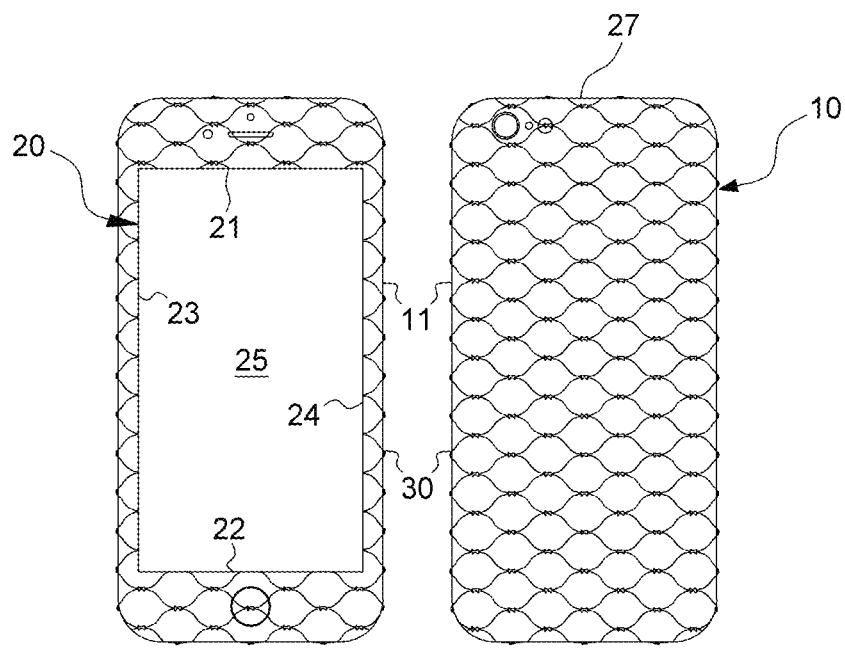
FIG. 1 illustrates a front view of a stretchable net cover according to aspects of the present disclosure, shown positioned on mobile electronic device.
FIG. 2 illustrates a back view of the stretchable net cover of FIG. 1 shown positioned on a mobile electronic device.

In the following description, the present invention is set forth in the context of various alternative embodiments and implementations involving stretchy net covers or cases for mobile electronic devices. The embodiments disclosed herein will change and advance the method by which we "wear" these computers and will become increasingly valuable as the Internet of Things and wearable technologies advance and internet technology rapidly migrates to 5G, rendering mobile electronic devices nearly indispensable.

Various aspects of the covers and cases may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the systems, methods, covers, and cases disclosed herein may be illustrated with reference to one or more exemplary implementations. As used herein, the term "exemplary" means "serving as an example, instance, or illustration," and should not necessarily be construed as preferred or advantageous over other variations of the systems or methods disclosed herein. "Optional" or "optionally" means that the subsequently described event or circumstance may or may not occur, and that the description includes instances where the event occurs and instances where it does not.

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Certain terminology is used in the following description for convenience only and is not limiting. The words "lower," "upper," "bottom," "top," "front," "back," "left," "right" and "sides" designate directions in the drawings to which reference is made but are not limiting with respect to the orientation in which the various parts of the needle or any assembly of them may be used.

It must also be noted that as used herein and in the appended claims, the singular forms "a", "an", and "the" include the plural reference unless the context clearly dictates otherwise. Thus, for example, reference to "a" webbing, "an" elastomeric material, or "the" cover, is a reference to one or more of each and equivalents thereof known to those skilled in the art, and so forth. Unless defined otherwise, all technical and scientific terms used herein have the same meanings as commonly understood by one of ordinary skill in the art.

"Substantially the same", as used herein, is understood to mean that two values or measurements are within 30% of each other, such as within 20% of each other, or within 10% of each other, or even within 5% of each other. Where it is indicated that two values are the same as each other is understood to mean that two values or measurements deviate from one another by less than 5%, or even less than 2%.

The term "mobile electronic device" is used broadly herein to refer to a portable electronic device that is useful for communication, control, learning, entertainment, and the like. Exemplary mobile electronic devices include any of a cellular phone or smart phone; a laptop computer; a global positioning system (GPS) system; a digital music player (MP3 player, iPod® or the like); an electronic gaming system (Nintendo® DS; PSP®; etc.); a camera; a remote control; a personal digital assistant (PDA); a radio; a two-way radio; a citizens band radio; a walkie-talkie; a video recorder; a cassette player and/or recorder; a mini-cassette recorder; a DVD player; a portable television; a digital camera; a video camera; a portable computer (laptop computer, iPad®, tablet, or the like); a digital media player or tablet computer (such as an iPad® or the like); a radar detector; an e-book or e-reader (Kindle®, Nook®, iPad®, Sony Reader™, or the like); a television (TV) remote control; a remote control; a calculator; test equipment; monitoring equipment; medical devices; etc.

Mobile electronic devices have become ubiquitous and are generally considered essential components of modern life. For example, smart, rectangular, internet-connected phones like the Apple iPhone, the Samsung phone, and the Google Android have become essential communication devices. Previously, flip phones, "candy bar" phones, and Palm and Treo devices were not used with the frequency that phones are used today. They were smaller, of varying design, and were mostly used secondarily to landlines, since cell service could still be unreliable. Few had cameras. The applications contained on the devices were primitive. Some phones did have antennas around which a loop could be affixed, and some did come with leather cases worn attached to your belt.

The size and shape of modern electronic devices, however, renders them more difficult to hold and carry. Many do not include antennas and most, if not all, are poorly configured to be carried on a user's belt. The covers and cases disclosed herein provide comfortable, strong, yet stretchy net materials that help solve these problems. A user may hook one or more fingers through mesh openings in the net material to hold and/or carry the mobile electronic device, thus allowing the user to secure the device to a hand like a glove. The user may even slide a hand and/or forearm through the mesh openings in the net material to secure the mobile electronic device thereon, providing extended use configurations and even expanding the user base. For example, a user having mobility issues of their hands and/or fingers such as arthritis, or even a person missing finger(s) or a hand, could still hold and carry a mobile electronic device or attach it to an object such as a walker, using the inventive covers and cases disclosed herein.

When provided as a cover, the present invention may be used over a mobile electronic device already housed within a case, or may cover a "naked" device, i.e., a device not housed within a case. As such, the cover provides an attractive add-on that expands the functionality of a user's current mobile electronic device configuration, i.e., the user does not have to purchase a new case. The stretchiness of the cover may also allow a user to reuse the same cover on a range of similarly sized devices, or on the same device included with or without a case.

The inventive covers and cases provide further holding and carrying possibilities by permitting attachment of hooks, carabiners, and the like to hook the mobile electronic device to a purse, belt loop, lanyard, or retractable or static leash. For example, it could be hooked to a room or shower door with a simple "S" hook. Moreover, the inventive covers and cases provide means to carry items such as credit and ID cards, wired or wireless earbuds, chargers, tissues, lip balm, keys, and the like inside the flexible net material, or access an adhesive card wallet or pouch stored therein. Attachment elements may be hooked to the mesh to provide attachment of additional items on an outside of the mesh, such as a hook to hold a face mask or keys, charms, or the like.

Additional standard accessories may be included, or previously attached accessories may remain. For example, the flexible webbing may accommodate accessories such as a PopSocket, ring, or phone stand through the mesh openings. The mesh openings may be arranged to accommodate a wide range of configurations and functionality or may be trimmed to accommodate the wide range of configurations and functionality as will be discussed hereinbelow.

The inventive covers and cases also provide for a range of personalization options, such as inclusion of logos on the webbing or on charms attached thereto, e.g., school or company logos, and even manufacturing the covers and cases in a wide range of colors.

The inventive covers and cases may be formed of stretchable polymeric materials that are easily washed and sanitized. That is, at least the webbing of the covers and cases is formed of a flexible elastic webbing or flexible polymeric material formed into a webbing. Exemplary polymeric materials have a durometer of 20 A to 65 A (Shore A hardness), such as at least 20 A, at least 25 A, at least 30 A, at least 35 A, at least 40 A, at least 45 A, at least 50 A, at least 55 A; or up to 65 A, or up to 60 A, or up to 55 A, or up to 50 A, or any combination of lower and upper limit of Shore A hardness (e.g., from 20 A to 65 A, etc.). Exemplary flexible materials include thermoplastic elastomers, such as natural and synthetic rubbers, silicones, polydimethylsiloxane (PDMS) or silicone rubber, poly(butyl methacrylate), thermoplastic polyurethane resin (TPU), or combinations thereof. Further exemplary thermoplastic elastomers include styrenics (styrenics block copolymers), copolyesters, vulcanizates, polyurethanes, polyamides, polyolefin blends, polyolefin alloys, polyolefin plastomers and elastomers (e.g., very low molecular weight, linear low-density polyethylene).

According to certain aspects, various portions on the covers and cases disclosed herein, such as the webbing, may be antimicrobial or may comprise an antimicrobial additive. Exemplary antimicrobial materials include antimicrobial polymers prepared from nitrogen- and/or phosphorus-functionalized monomers. Additional exemplary antimicrobial materials include antimicrobial polymers comprising any of the polymeric materials disclosed herein and an antimicrobial agent such as elemental silver, silver oxides, silver salts, silver ion exchange compounds, silver zeolites, silver glasses, and mixtures thereof. Specific examples of antimicrobial agents include silver zeolite, silver zirconium phosphate, silver nitrate, silver thiosulfate, silver sulphadiazine, silver fusidate, silver acetate, silver bromide, silver carbonate, silver chlorate, silver chloride, silver citrate, silver fluoride, silver iodate, silver lactate, silver nitrite, silver perchlorate, silver sulfide.

Preferred polymeric materials include silicone, fluorosilicone, silicone rubber, thermoplastic vulcanizates, thermoplastic polyurethane, and antimicrobial versions of the same comprising an antimicrobial agent or additive such as silver nanoparticles or silver ion-based agents.

The inventive covers and cases disclosed herein offer additional advantages beyond easy cleaning and sanitizing; they may further allow wireless charging of a mobile electronic device, such as on any of the wireless chargers known and used in the art. That is, when a mobile electronic device having a cover or case of the present disclosure positioned thereon is placed on a wireless charging pad or station, the cover and/or the case may not interfere with wireless charging of the device.

The webbing of the inventive covers and cases can be trimmed, either by a user or as a manufacturing step to provide access to various buttons, cameras, and access points (e.g., wired charging port, audio input/output, USB ports, etc.) of a mobile electronic device contained therein. Alternatively, the covers and/or cases disclosed herein may be configured to provide access to various buttons, cameras, and access points (e.g., wired charging port, audio input/output, USB ports, etc.) of a mobile electronic device contained therein (i.e., manufactured de novo in specific configurations).

A top edge and/or one or both side edges of the webbing, such as along edges that are coincident with top, bottom, or side edges of the mobile electronic device being covered or encased, may include a larger opening to provide access openings, such as for insertion of items like credit cards, small papers, etc. Alternatively, the larger opening may be positioned at a point along the back of the cover or case in either a longitudinal or lateral direction. The larger opening may be formed upon manufacture, or may be formed by a user, e.g., slitting the webbing. The webbing may alternatively be designed to have a zip-loc type opening at the top or side(s) edges or along the back side to provide access.

The inventive covers and cases may be attachable to a mobile electronic device by inserting the device through the opening in the cover or case or sliding the cover over the device if manufactured with an open top or side.

Figure 15:
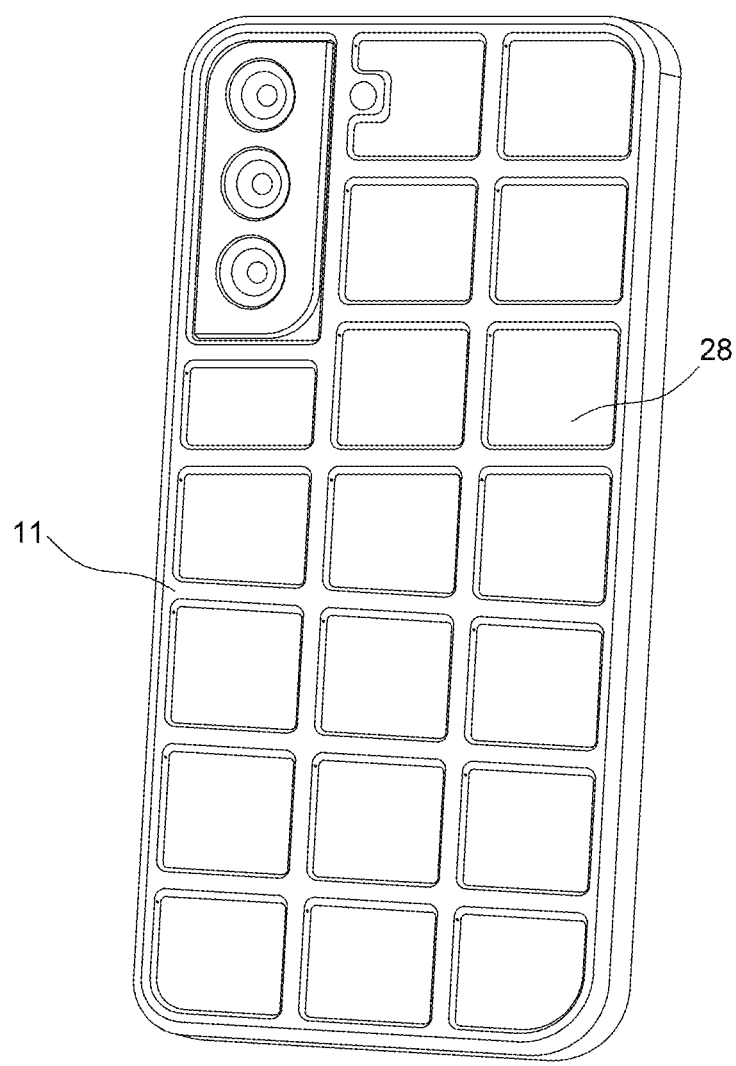
Figure 16:
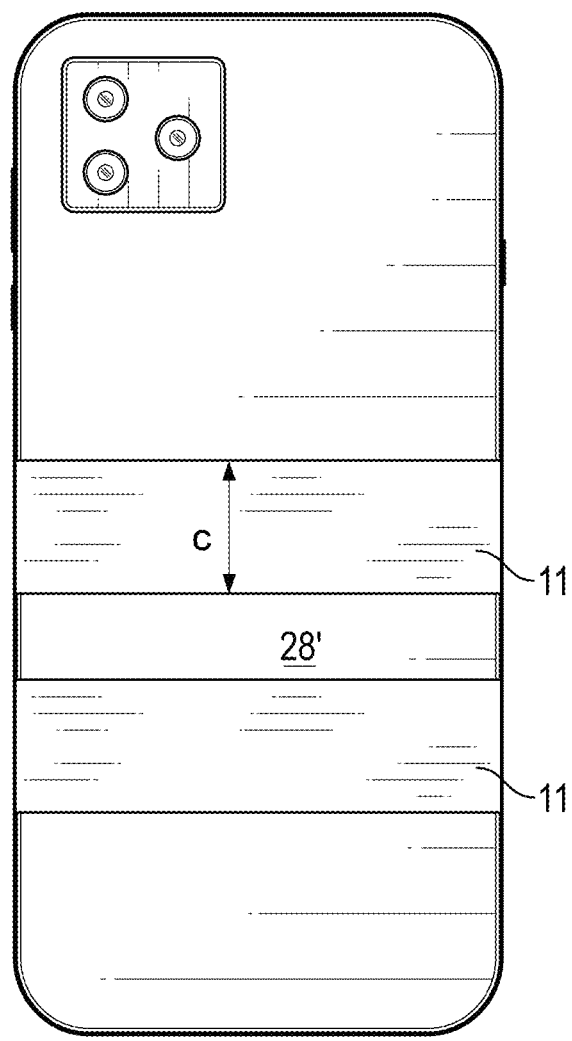
Figure 17A:
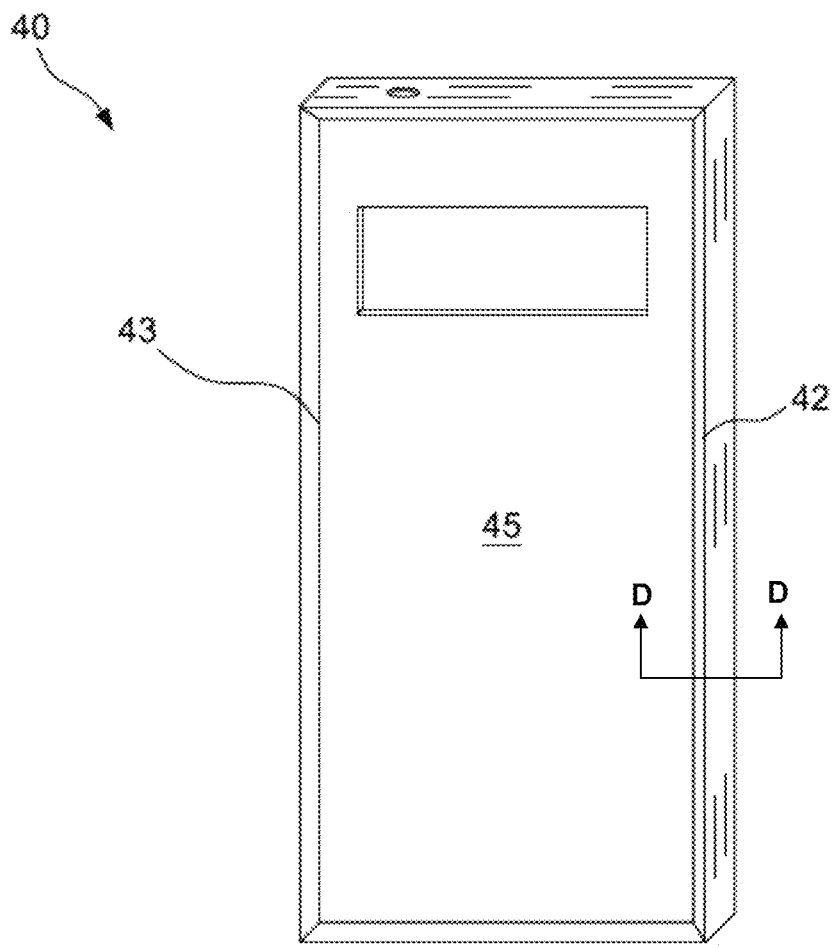
FIG. 17A illustrates a front view of a case according to aspects of the present disclosure.
Figure 17B:
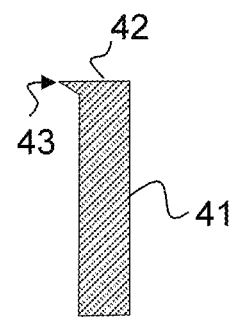
FIG. 17B illustrates a cross-sectional view taken along line D-D of a side wall of the case of FIG. 17A.
Figure 18:
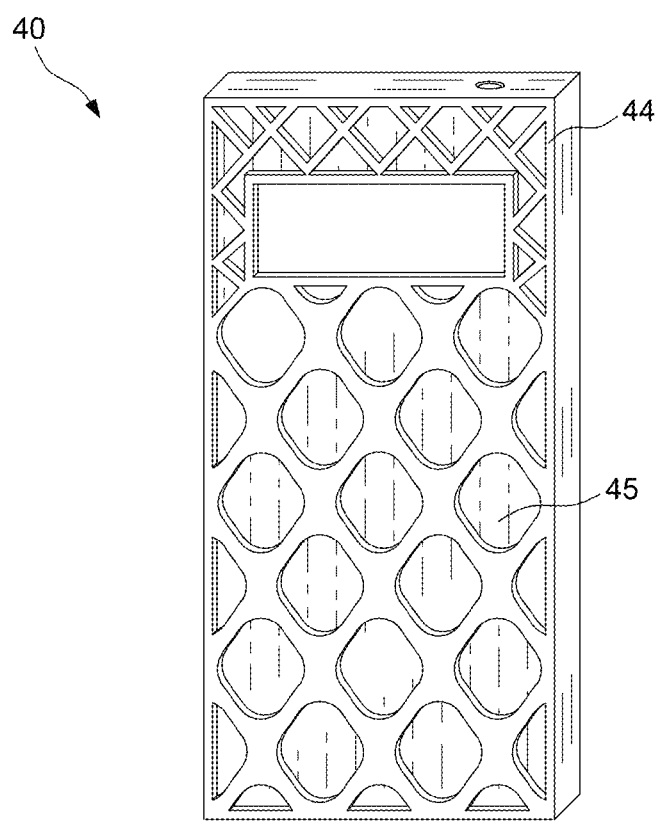
FIG. 18 illustrates a back view of the case of FIG. 17A.

With reference now to the figures, exemplary covers according to aspects of the presently disclosed invention are illustrated in FIGS. 1-11, exemplary designs for covers and cases are illustrated in FIGS. 12-16, and exemplary cases are illustrated in FIGS. 17A-18.

With specific reference to FIGS. 1-6, shown is a cover according to aspects of the present disclosure removeably attached about a mobile electronic device, e.g., a mobile phone. The cover generally comprises a body 10 of flexible webbing 11, wherein the webbing is configured to cover a back (see FIG. 2), sides (see FIGS. 3-6), and at least a portion of a front of a mobile electronic device (see FIG. 1). The cover further comprises a frame 20 having a top edge 21, a bottom edge 22, and opposing side edges (23, 24) that define an opening 25 in the body configured to expose a front screen region of the mobile electronic device. Shown in FIGS. 1 and 2 are connection points 30 for the webbing 11, which may include thickened regions of the polymeric materials, e.g., silicone, or knots connecting individual strands of the webbing. Alternately, the webbing may not vary in thickness across connection or intersection points.

The body 10 and frame 20 each comprise a flexible material configured to provide removeable attachment of the cover over the mobile electronic device. For example, a user may slide the device through the front opening 25 defined by the frame 20 and stretch the body 10 around the device so that the frame 20 is substantially coincident with edges of the front display screen of the device. Alternatively, the body 10 of the cover may include an opening, such as an opening of the webbing adjacent one end of the body 10, i.e., nearest to one of the edges (21-24) of the frame, such as nearest to the region of webbing that would be adjacent a top end 27 of the covered mobile electronic device. The mobile electronic device may be slipped through the opening so that the cover encases the device with the frame 20 coincident with edges of the front display screen thereof.

Accordingly, the inventive cover may have at least two configurations. A first initial configuration, which may include the cover separated from the mobile electronic device, wherein the top, bottom, and side edges of the frame have a first overall dimension, and the body is unstretched. A second installed configuration, which may include the cover positioned around the mobile electronic device so that the body is stretched about the back and sides of the mobile electronic device, and the top, bottom, and side edges of the frame have a second overall dimension (as shown in FIGS. 1-6). According to certain aspects, the frame may be stretched when removeably attaching the cover to a mobile electronic device, i.e., while the cover is not in either of first or second configurations, but the first and second overall dimensions of the frame may be generally substantially the same or are the same.

Figure 5:
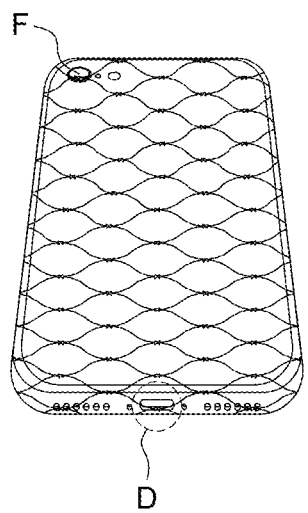
FIG. 5 illustrates a bottom perspective view of the stretchable net cover of FIG. 1 shown positioned on a mobile electronic device.
Figure 6:
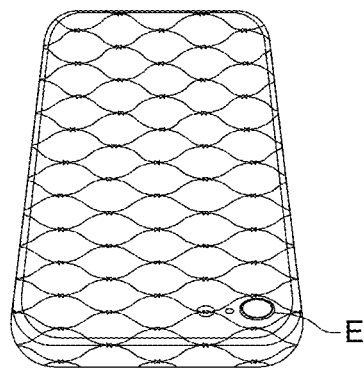
FIG. 6 illustrates a top perspective view of the stretchable net cover of FIG. 1 shown positioned on a mobile electronic device.
Figures 3, 4:
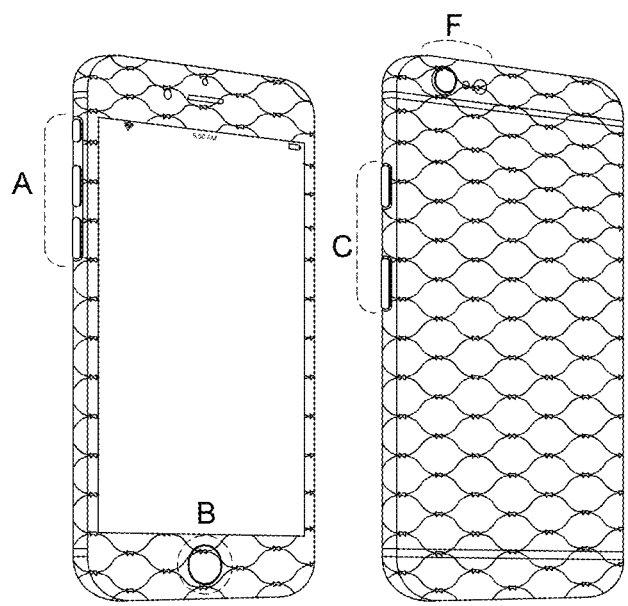
FIG. 3 illustrates a front perspective view of the stretchable net cover of FIG. 1 shown positioned on a mobile electronic device.
FIG. 4 illustrates a back perspective view of the stretchable net cover of FIG. 1 shown positioned on a mobile electronic device.

The webbing 11 of the body 10 may be pushed aside by a user to gain access to various buttons or ports on a mobile electronic device contained within the cover. Alternatively, or in addition, the webbing 11 may be removed after manufacture, such as by a user, to accommodate various access points on a mobile electronic device contained within the cover. For example, sections of the webbing may be removed (A, B, C; FIGS. 3, 4) to provide unobstructed access to buttons on the mobile electronic device, or for a camera (E, F; FIG. 4, 6) on the mobile electronic device. As shown in FIG. 5, sections of the webbing may be removed (D) to provide unobstructed access to a charging port.

When the cover is manufactured without openings configured for specific devices, the user may alter the cover. For example, after the cover is removeably attached to the device, the webbing may be snipped or adjusted to customize it to the device, such as to a specific model of a phone. That is, small areas of the webbing can be cut to better allow for use of a rear camera, function buttons and switches on the side, a front camera, and/or touch ID sensor. Charging the device via a lightning or similar charger can be accomplished by slightly pulling the webbing out of the way, or by snipping a small opening as described.

Figure 9:
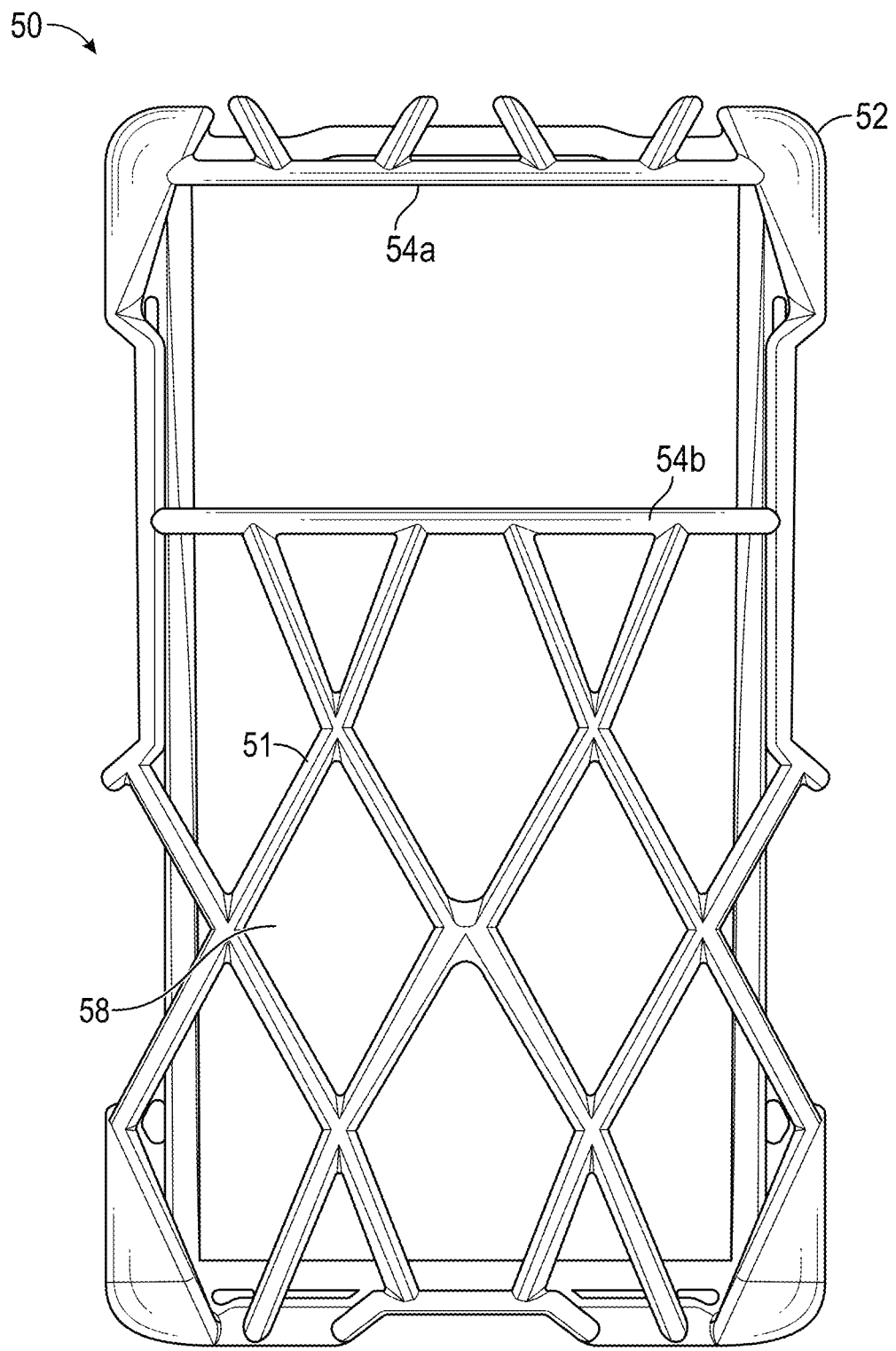
FIG. 9 illustrates a back view of a stretchable net cover according to aspects of the present disclosure.
Figure 10:
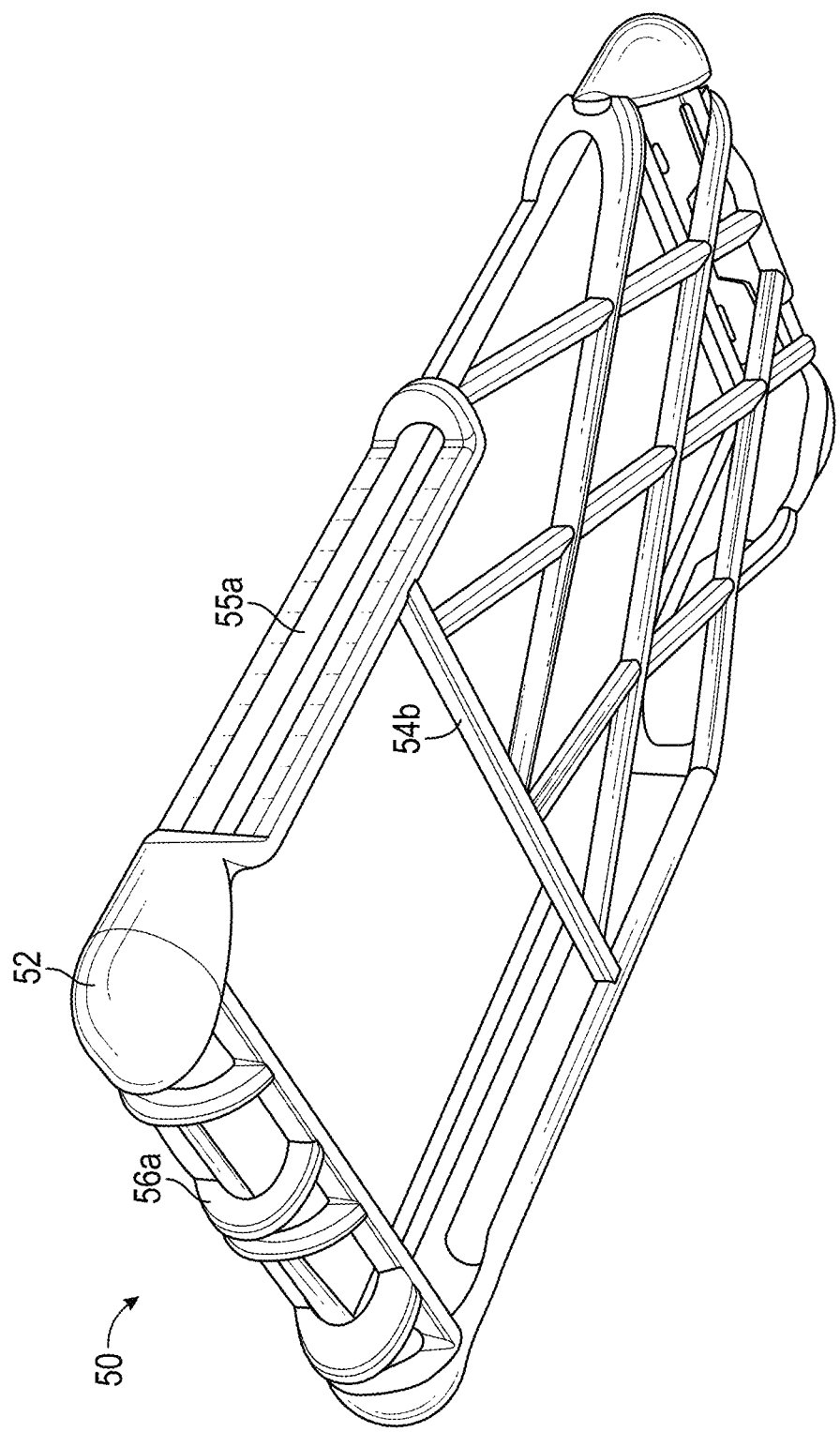
FIG. 10 illustrates a back perspective view of the stretchable net cover of FIG. 9.
Figure 11:
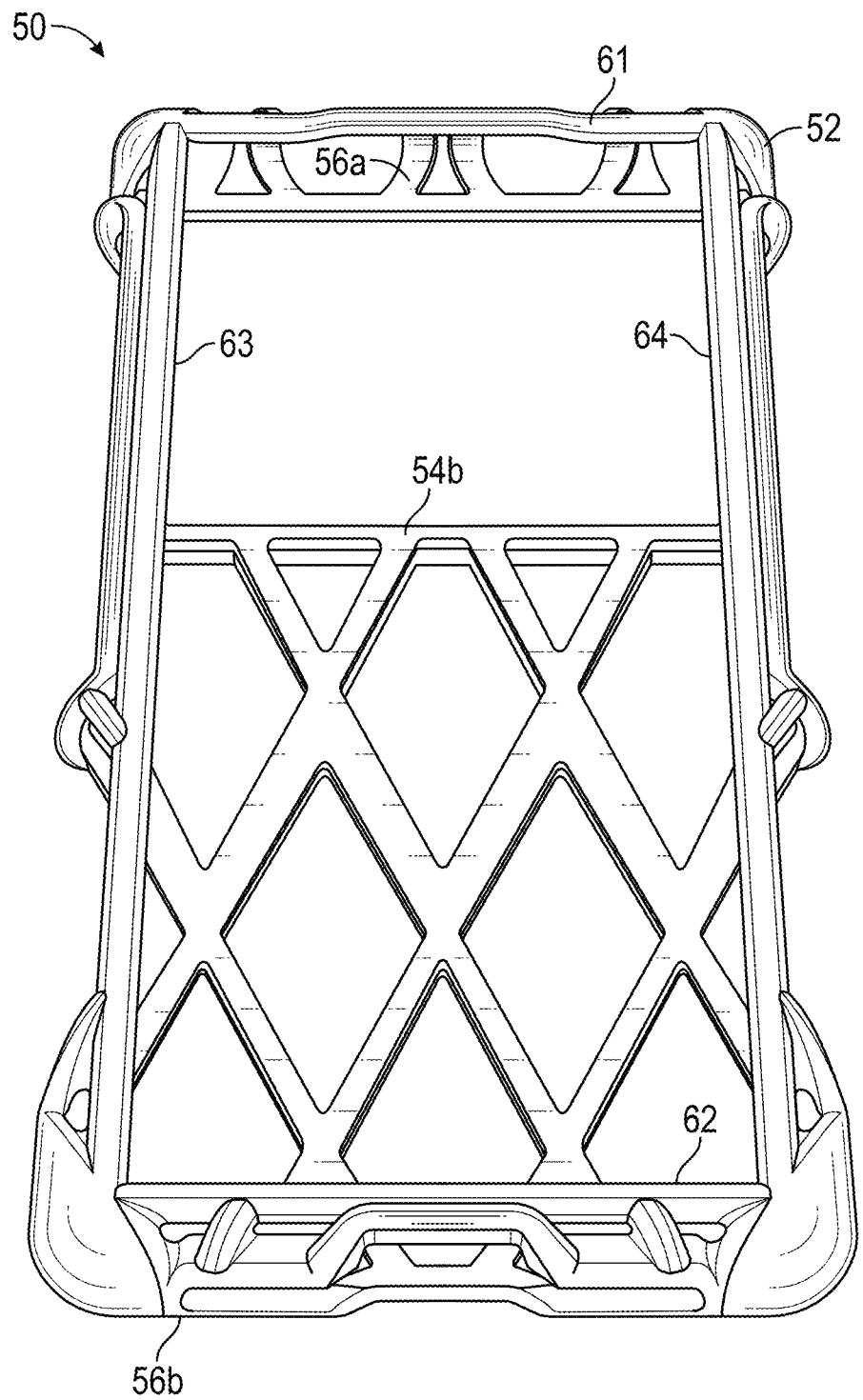
FIG. 11 illustrates a front view of the stretchable net cover of FIG. 9.

The cover may be manufactured to accommodate specific configurations of mobile electronic devices. As such, the cover may include openings that provide unobstructed access to buttons, cameras, and other ports on the mobile electronic device, wherein the openings are arranged based on the specific device configurations. One such exemplary configuration is shown in FIGS. 9-11, with additional configurations useful as covers or cases shown in FIGS. 12-16.

Figure 7:
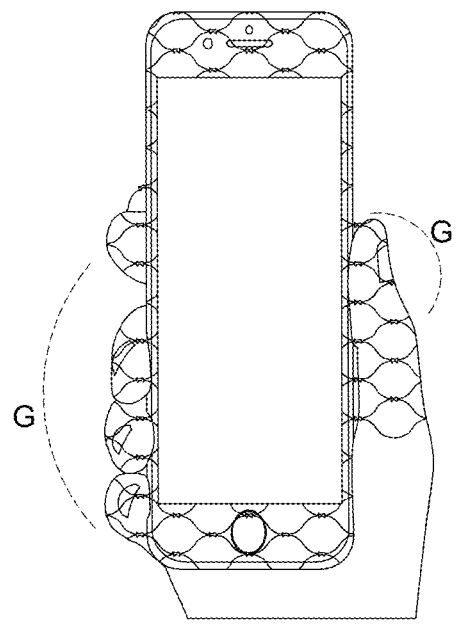
FIG. 7 illustrates a front view of the stretchable net cover of FIG. 1 shown positioned on a mobile electronic device with a user's fingers looped through webbing of the stretchable net cover.
Figure 8:
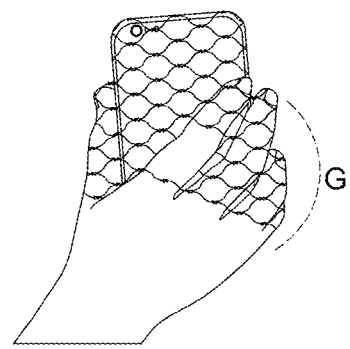
FIG. 8 illustrates a back view of the stretchable net cover of FIG. 1 shown positioned on a mobile electronic device with a user's fingers looped through webbing of the stretchable net cover.

With specific reference to FIGS. 7 and 8, the webbing of the body portion of an inventive cover or case of the present disclosure allows numerous, easy methods for a user to grip a mobile electronic device. A user's fingers are shown engaged within the webbing, wherein the webbing comprises a sufficient stretch to allow the user to comfortably hold the device (see webbing region G). Moreover, the webbing allows the user to adjust their grip, e.g., change the number of fingers used to grip and/or the position on the device that is gripped, thus reducing hand fatigue.

While the material is flexible, it is also resilient and will reform on the encased or covered device when the user releases the webbing. Exemplary materials having such resilience include any of the polymeric materials listed hereinabove, such as at least the elastomeric polymers silicone, polydimethylsiloxane (PDMS) or silicone rubber, poly(butyl methacrylate), natural or synthetic rubber, thermoplastic polyurethane resin (TPU), or combinations thereof.

The body 10 and frame 20 may comprise the same flexible material. For example, the frame may comprise a thickened region of the flexible material. Alternatively, the frame may comprise a different material than the body, such as a less flexible or less stretchable material to enhance the ability of the frame to maintain a specific shape and dimensional configuration. As example, the webbing may comprise a polymeric material having a durometer of 20 A to 65 A (Shore A hardness) as indicated hereinabove, and the frame may comprise a polymeric material having a durometer of at least 50 A (Shore A hardness), such as at least 55 A, at least 60, at least at least 70 A; or up to 75 A, up to 70 A, up to 65 A, up to 60 A, up to 55; or any combination of lower and upper limit of Shore A hardness (e.g., from 50 A to 70 A, etc.). For example, the frame may have a Shore D hardness of at least 20 D, such as at least 25 D, at least 30 D, at least at least 40 D, at least 45 D, at least 50 D, at least 55 D; or up to 60 D, up to 55 D, up to 50 D, up to 45 D, up to 40 D, up to 35 D, or up to 30 D, or up to 25 D; or any combination of upper and lower limit of Shore D hardness.

The webbing may have a webbing thickness (i.e., thickness as measured perpendicular to the longitudinal axis of the cover) of 0.3 mm to 20 mm, such as at least 1 mm, at least 2 mm, at least 3 mm, at least 4 mm; or up to 7 mm, up to 6 mm, up to 5 mm, up to 4 mm, up to 3 mm; or any combination of upper and lower thicknesses (e.g., webbing thickness of 2 mm to 6 mm, or 2 mm to 4 mm, etc.). As indicated above, the thickness of the webbing (i.e., webbing thickness) may be the same as the thickness of the frame or may be different from the thickness of the frame. According to certain aspects, the frame may be thicker than the webbing thickness. As such, the frame thickness may be 1 mm to 20 mm, such as at least 1 mm, at least 2 mm, at least 3 mm, at least 4 mm; or up to 7 mm, up to 6 mm, up to 5 mm, up to 4 mm, up to 3 mm; or any combination of lower and upper thicknesses. A thicker frame region may enhance the protective capabilities of the covers disclosed herein.

The webbing thickness may vary in the body portion of the cover, such as across a longitudinal extent of the body (i.e., from a top to a bottom when positioned on a mobile electronic device). Moreover, the webbing may have a webbing thickness configured for a size of the device it is intended to cover, and additionally configured to provide comfort for the user.

The webbing of the body 10 may include a mesh configured to allow a user to engage one or more fingers within the mesh openings. For example, an exemplary inner diameter of individual mesh or webbing openings (i.e., webbing diameter; width as measured along the longitudinal or lateral axis of the cover) may be 0.3 cm to 7.5 cm, such as at least 0.3 cm, at least 1 cm, at least 2 cm, at least 3 cm, at least 4 cm, at least 5 cm; or at least 6 cm, or up to 7.5 cm, up to 7 cm, up to 6 cm, up to 5 cm, up to 4 cm, up to 3 cm, or up to 2 cm; or any combination of lower and upper diameters (e.g., 2 cm to 5.5 cm, 2 cm to 5 cm, etc.).

The mesh openings, i.e., webbing diameter, may vary in size across a longitudinal or lateral extent of the body portion, such as larger or smaller in regions positionable adjacent a top of the mobile electronic device. Moreover, the webbing may have a webbing diameter configured for a size of the device it is intended to cover, and additionally configured to provide comfort for the user.

Illustrated in FIGS. 9-11 is another exemplary configuration of a cover according to the present disclosure. The back view of the cover 50 is shown in FIG. 9, wherein the webbing 51 is configured to cover a back of a mobile electronic device and includes diamond shaped openings 58. According to certain configurations, a gap defined by a top border 54a and a bottom border 54b may be included, wherein the gap may be configured to provide an unobstructed view for a camera or other element on a back of the mobile electronic device.

As illustrated, the cover 50 may include reinforced regions 52 at corners of the cover. Such regions would be coincident with corners of a mobile electronic device and may provide additional protection from impact damage should the device be dropped. The reinforced regions 52 may also strengthen the webbing 51 in these regions against tears or damage when the cover is installed over a mobile electronic device.

The side regions of the cover 50 may include webbing having different design configurations to provide additional strength to the cover 50 and/or access openings or regions for various buttons and ports on the mobile electronic device. For example, as shown in FIGS. 10 and 11, a side of the cover 50 may include an opening 55a that provides direct access to buttons on the mobile electronic device. Moreover, sides of the cover 50 may include webbing (e.g., 56a, 56b) having a different design configuration that the webbing 51 on a back of the cover to allow access to various ports or buttons (e.g., webbing 56b at a second end) and/or reinforce the regions at the sides of the cover (e.g., webbing 56a at a first end).

With reference to FIG. 11, the cover 50 may further include a frame having a top edge 61, a bottom edge 62, and opposing side edges (63, 64) that define an opening in the cover configured to expose a front screen region of the mobile electronic device.

Figure 12:
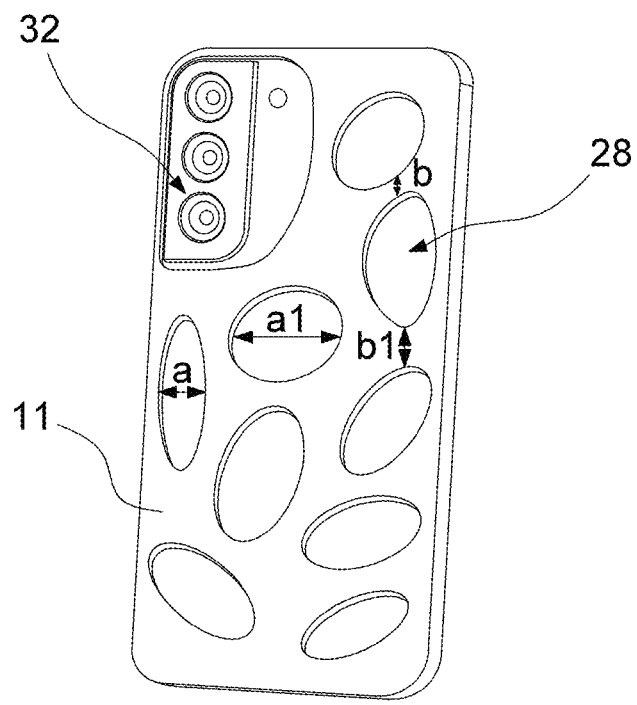
FIGS. 12-16 illustrate back views of a stretchable net cover or case according to aspects of the present disclosure positioned on a mobile electronic device.
Figure 13:
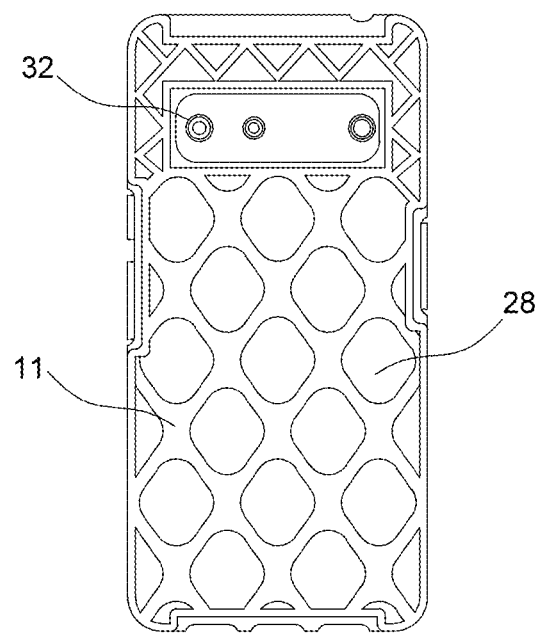
Figure 14:
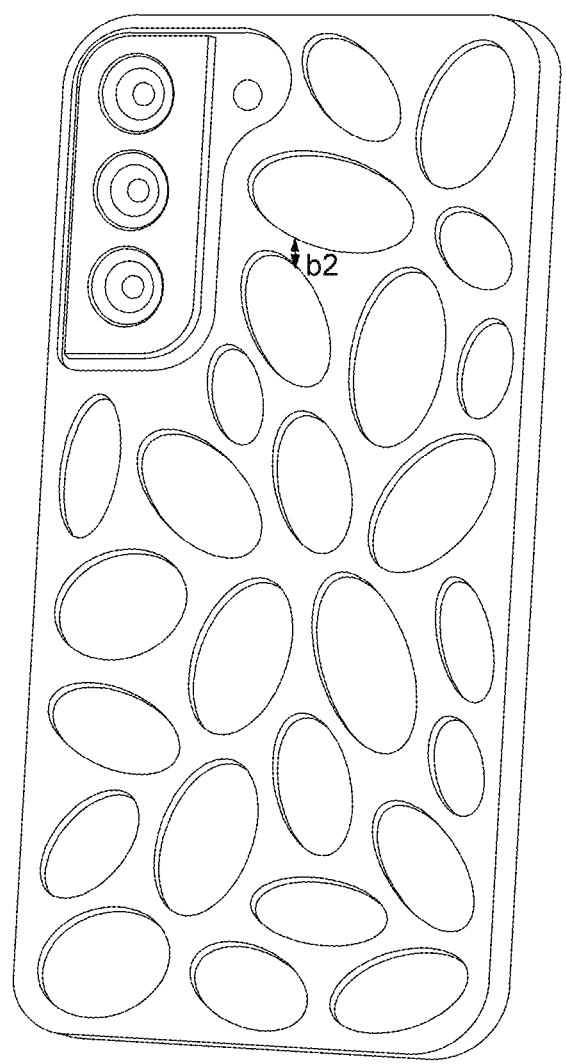

Illustrated in FIGS. 12-16 are additional possible designs for the webbing of the presently disclosed cover or case (see below for specific description of a case). As shown in FIGS. 12 and 14, the webbing 11 may be formed such that the size and shape of the openings in the material is irregular (e.g., distances 'a' and 'a1' in FIG. 12). Additionally, or alternatively, the amount of material disposed between openings in the webbing 11 may vary in a single cover or case (e.g., distances 'b' and 'b1' in FIG. 12) and between designs (see 'b3' of FIG. 12 to 'b2' of FIG. 14).

Illustrated in FIGS. 13, 15, and 16 are additional webbing designs, wherein the openings 28 in the webbing 11 are uniform and comprise a shape such as diamonds (FIG. 13), squares (FIG. 15), or any other polygonal shape. Shown in FIG. 16 is another configuration for the webbing 11, which may be configured as bands that form rectangular openings 28'. Such openings may provide attachment over a user's arm, over a handle on a bike or walker, and the like. While two such bands are shown in FIG. 16, any number of bands is possible and within the scope of the present disclosure. Moreover, each band may have the same or a different width "c" and/or may be spaced to provide openings having uniform or non-uniform dimensions.

With specific reference to FIGS. 12 and 13, it is also evident that the cover or case may be specifically configured to accommodate different mobile device configurations. For example, the covers or cases in FIGS. 12 and 13 are designed and configured to accommodate different camera 32 positions, sizes, and shapes, and differing locations of the various buttons on the mobile electronic devices.

According to certain aspects, the cover or case may include certain portions of the flexible webbing that are enhanced by a solid construction of the same or different material as the webbing to provide support and durability. Exemplary reinforced portions include corners of the cover. Moreover, a back region of the cover or case may be absent any solid construction. As such, the covers and cases disclosed herein may include webbing that is enhanced by a solid construction of the same or different material as the webbing at corners thereof while being absent any solid construction along a remainder of a rear portion.

The presently disclosed invention also provides a case that comprises a flexible webbing, and thus offers the same enhanced functionality described hereinabove in relation to the cover. With reference to FIGS. 17A-19, the case 40 may include a side wall 41 configured to extend around a perimeter of a mobile electronic device. The side wall includes a front perimeter 42, which according to certain aspects, may include a lip member 43 that extends inwardly from the front perimeter 42 of the sidewall 41. The inward lip member is repeatably deflectable to provide secure engagement of the mobile electronic device within an inner region of the case. The side wall 41 of the case 40 further comprises a rear perimeter 44. See the cross-sectional view of the sidewall 41 in FIG. 17B, which is taken along the line D-D of FIG. 17A and shows one configuration of an inward lip member 43 on the front perimeter 42 of the sidewall 41.

The flexible webbing may be attached along either the front perimeter 42 or lip 43, or rear perimeter 44 of the side wall 41 and extends about a back side thereof. The side wall and flexible webbing are configured to provide removeable attachment of the case about the mobile electronic device such that a front portion is substantially uncovered, such as a screen or keyboard or interaction buttons on the front portion of the mobile electronic device.

Figure 19:
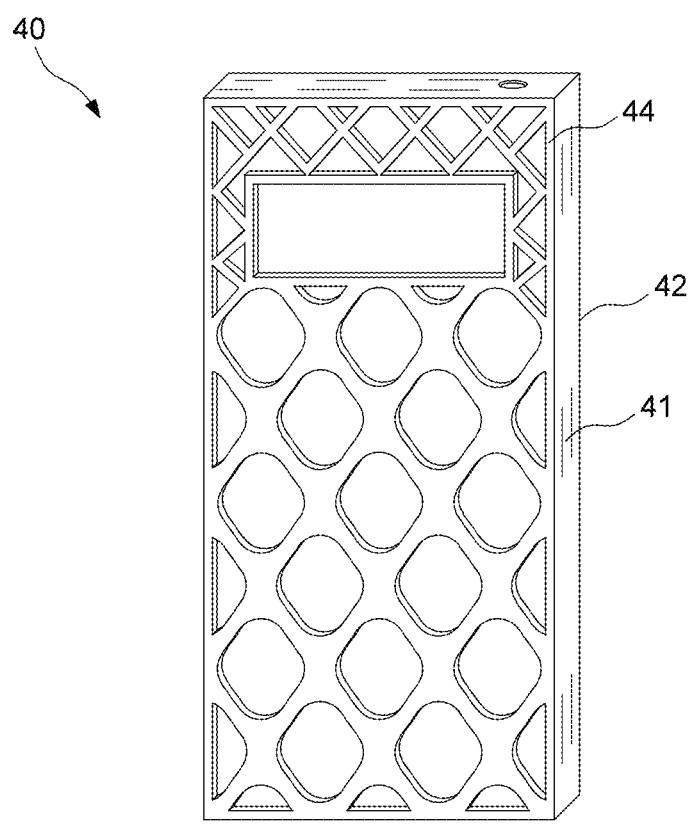
FIG. 19 illustrates a back view of a case according to aspects of the present disclosure.

According to certain aspects, the case 40 may further include a back panel 45 extending from the rear perimeter 44 of the body portion, wherein the flexible webbing is disposed over the back panel. For example, the back panel 45 is shown in FIG. 17A as a solid panel with openings for various elements of the mobile electronic device. The back panel 45 is illustrated as positioned under the webbing in FIG. 18. Alternatively, the cover may be absent any additional back panel, such as shown in FIG. 19, wherein the flexible webbing forms the back portion of the cover.

The flexible webbing is generally configured to accept a user's fingers through the mesh openings. The webbing thickness and diameter may be as described hereinabove for the cover. Moreover, the webbing may comprise a flexible polymer, such as described hereinabove (i.e., any of the exemplary polymeric materials listed above). As indicated, the flexible webbing may be attached along a front perimeter 42 or a rear perimeter 44 of the side wall 41 (the flexible webbing is shown as attached along the rear perimeter 44 in FIGS. 18 and 19).

According to certain aspects, the side wall 41 and/or back panel 45 may comprise a flexible polymer that is the same or different than the flexible polymer of the webbing. For example, the side wall and/or back panel may comprise a polymeric material having a durometer of at least 50 A (Shore A hardness), such as at least 55 A, at least 60, at least 65 A, at least 70 A; or up to 75 A, up to 70 A, up to 65 A, up to 60 A, up to 55; or any combination of lower and upper limit of Shore A hardness (e.g., from 50 A to 70 A, etc.). The side wall and/or back panel may have a Shore D hardness of at least 20 D, such as at least 25 D, at least 30 D, at least 35 D, at least 40 D, at least 45 D, at least 50 D, at least 55 D; or up to 60 D, up to 55 D, up to 50 D, up to 45 D, up to 40 D, up to 35 D, or up to 30 D, or up to 25 D; or any combination of upper and lower limit of Shore D hardness.

Alternatively, the side wall and/or back panel may be formed of a less flexible polymeric material, such as a material having a durometer of greater than 60 A (shore A) or at least 20 D (shore D). In certain examples, the back panel 45 may be formed of a clear polymeric material. As such, certain opening in the back panel 45 may not be needed, such as openings for a camera of the mobile electronic device.

The case 40 may generally be configured as a case for a cellular phone, a tablet computer, an electronic gaming system, a digital music player, a global positioning system, and combinations thereof. Portions of the flexible webbing and/or the body portion may be removed to accommodate access points on the mobile electronic device when the case is installed therein.

The covers and cases disclosed herein may be augmented by adding key rings, rings, S-hooks, charms, carabiners, etc., to clip to clothing or other structures like a shower door or a doorknob or a walker or a car vent. Moreover, the covers and cases disclosed herein may not interfere with newly attached or previously installed accessories (e.g., Pop Socket).

While specific embodiments of the invention have been described in detail, it should be appreciated by those skilled in the art that various modifications and alternations and applications could be developed considering the overall teachings of the disclosure. Accordingly, the particular arrangements, systems, apparatuses, and methods disclosed are meant to be illustrative only and not limiting as to the scope of the invention.

What is claimed is:

1. A case for a mobile electronic device, the case comprising:
    a side wall configured to extend around a perimeter of a mobile electronic device, the side wall having a front perimeter and a rear perimeter;
    a webbing formed of a flexible material, the webbing connected along the rear perimeter of the side wall; and
    a back panel attached along the rear perimeter of the side wall, wherein the side wall extends substantially perpendicular from the back panel, and wherein the webbing is disposed over an outer surface of the back panel,
    wherein an inner surface of each of the back panel and the side wall form an inner region of the case configured to accept the mobile electronic device therein,
    wherein the front perimeter of the side wall comprises an inward lip member configured to extend inward around a front of the mobile electronic device, wherein the inward lip member is repeatably deflectable to provide secure engagement of the mobile electronic device within an inner perimeter of the side wall of the case,
    wherein the side wall, back panel, and webbing are configured to provide removeable attachment of the case about the mobile electronic device such that a front portion of the mobile electronic device remains substantially uncovered and a rear portion of the mobile electronic device is substantially covered by the back panel and webbing, and
    wherein the webbing comprises openings configured to accept a user's fingers therethrough.

2. The case of claim 1, wherein the side wall and the webbing are of unitary construction.

3. The case of claim 2, wherein the side wall and the webbing comprise a flexible silicone material having a Shore A hardness of 20 A to 65 A.

4. The case of claim 1, wherein portions of the webbing, the side wall, or both the webbing and the side wall are absent to accommodate one or more access points on the mobile electronic device when the case is installed thereon.

5. The case of claim 1, wherein portions of the webbing, the back panel, the side wall, or any combination thereof are absent to accommodate one or more access points on the mobile electronic device when the case is installed thereon.

6. The case of claim 1, wherein the webbing comprises a flexible silicone material configured to provide restorable extension of the webbing when the user's fingers are accepted through the openings in the webbing.

7. The case of claim 1, wherein the flexible material comprises a flexible silicone material having a Shore A hardness of 20 A to 65 A.

8. The case of claim 1, wherein the webbing has a webbing thickness of 0.3 mm to 20 mm.

9. The case of claim 8, wherein a thickness of the side wall is greater than the webbing thickness.

10. The case of claim 1, wherein the webbing and the side wall comprise different flexible materials.

11. The case of claim 1, wherein the openings of the webbing have a diameter of 0.3 cm to 10 cm.

12. The case of claim 1, wherein the openings in the webbing vary in diameter across a longitudinal extent of the case.

13. The case of claim 1, configured to cover a cellular phone, a tablet computer, an electronic gaming system, a digital music player, a laptop computer, a global positioning system, or any combination thereof.

14. A case for a mobile electronic device, the case comprising:
a side wall configured to extend around a perimeter of a mobile electronic device, the side wall having a front perimeter and a rear perimeter, wherein the front perimeter comprises an inward lip member configured to extend inward around a front of the mobile electronic device, wherein the inward lip member is repeatably deflectable to provide secure engagement of the mobile electronic device within an inner perimeter of the side wall of the case;
a webbing formed of a flexible material, the webbing connected along the front perimeter of the side wall and extending about the rear perimeter along a back side of the case; and
a back panel attached along the rear perimeter of the side wall, wherein the side wall extends substantially perpendicular from the back panel, and wherein the webbing is disposed over an outer surface of the back panel,
wherein an inner surface of each of the back panel and the side wall form an inner region of the case configured to accept the mobile electronic device therein,
wherein the side wall, back panel, and webbing are configured to provide removeable attachment of the case about the mobile electronic device such that a front portion thereof is substantially uncovered, and
wherein the webbing comprises openings configured to accept a user's fingers therethrough.

15. The case of claim 14, wherein portions of the webbing, the side wall, or both the webbing and the side wall are absent to accommodate one or more access points on the mobile electronic device when the case is installed thereon.

16. The case of claim 14, wherein the side wall and the webbing are of unitary construction and comprise a flexible silicone material having a Shore A hardness of 20 A to 65 A.

17. The case of claim 14, wherein the webbing has a webbing thickness of 0.3 mm to 20 mm and webbing openings having a diameter of 0.3 cm to 10 cm.

* * * * *